United States Patent
Sbongk et al.

(10) Patent No.: US 11,098,745 B2
(45) Date of Patent: Aug. 24, 2021

(54) CONNECTOR WITH SIMPLIFIED AND RELIABLE MOUNTING

(71) Applicant: ILLINOIS TOOL WORKS INC., Glenview, IL (US)

(72) Inventors: Albert Sbongk, Niederstetten (DE); Christoph Leidig, Rothenburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 224 days.

(21) Appl. No.: 16/208,744

(22) Filed: Dec. 4, 2018

(65) Prior Publication Data
US 2019/0170180 A1 Jun. 6, 2019

(30) Foreign Application Priority Data

Dec. 5, 2017 (DE) .................. 10 2017 128 842.2

(51) Int. Cl.
*F16B 37/04* (2006.01)
(52) U.S. Cl.
CPC .......... *F16B 37/042* (2013.01); *F16B 37/044* (2013.01)
(58) Field of Classification Search
CPC ......... F16B 5/10; F16B 37/042; F16B 37/044
USPC .......................................... 411/551, 549, 349
See application file for complete search history.

(56) References Cited

U.S. PATENT DOCUMENTS

| | | | | |
|---|---|---|---|---|
| 2,681,679 A | * | 6/1954 | Poupitch | F16B 37/042 411/111 |
| 4,531,870 A | * | 7/1985 | Moryl | F16B 37/042 411/108 |
| 4,923,347 A | * | 5/1990 | Moryl | F16B 37/044 411/182 |
| 5,067,863 A | * | 11/1991 | Kowalski | F16B 37/044 411/112 |
| 6,435,790 B1 | * | 8/2002 | Ichikawa | F16B 5/0642 24/453 |
| 7,621,707 B2 | | 11/2009 | Sbongk | |
| 9,121,431 B2 | * | 9/2015 | Schraer | F16B 31/04 |
| 10,408,252 B2 | * | 9/2019 | Reznar | F16B 37/046 |
| 2008/0193251 A1 | | 8/2008 | Sbongk | |
| 2012/0308328 A1 | * | 12/2012 | Ueno | F24S 25/63 411/134 |

FOREIGN PATENT DOCUMENTS

| | | |
|---|---|---|
| DE | 69503312 | 2/1999 |
| DE | 102005032699 | 1/2007 |
| DE | 202013101019 | 6/2014 |
| EP | 0681110 | 11/1995 |
| FR | 2596473 | 10/1987 |
| FR | 2613439 | 10/1988 |

* cited by examiner

*Primary Examiner* — Flemming Saether
(74) *Attorney, Agent, or Firm* — Thompson Hine LLP

(57) ABSTRACT

Connector, wherein the connector is configured for connecting a first component to a second component, wherein the components each have an opening with cross sections different from a circular cross section, wherein the connector has a cage part which has a radial flange at one end and which has a stem portion with a cross section different from a circular cross section, said stem portion being insertable into the opening of the second component such that the flange is positioned against the front side of the second component, wherein the connector has a nut part which is at least partially accommodated by the cage part and that is rotatable, has an axial opening and has opposite wing portions.

5 Claims, 3 Drawing Sheets

CONNECTOR WITH SIMPLIFIED AND RELIABLE MOUNTING

TECHNICAL FIELD

The invention relates generally to connectors for use in connections in a motor vehicle.

BACKGROUND

The prior art EP 0 681 110 B1 and DE 10 2005 032 699 B4 each present a connector for connecting a first component to a second component.

The inventors found it disadvantageous that the mounting sequence which is associated with these connectors is not very reliable or simple.

SUMMARY

The object on which the invention is based was to improve the above-noted disadvantage. The object is achieved by means of the invention, in particular as defined in the independent claims.

In particular, this object is achieved by a connector, wherein the connector is configured for connecting a first component to a second component, wherein the components each have an opening with preferably angular, particularly preferably rectangular or square, cross sections different from a circular cross section, wherein the connector has a cage part which has a radial flange at one end and which has a stem portion with a preferably angular, particularly preferably rectangular or square, cross section different from a circular cross section, said stem portion being insertable into the opening of the second component such that the flange is positioned against the front side of the second component, wherein the connector has a nut part which is at least partially accommodated by the cage part and is rotatable from a first rotational position in the cage part into a second rotational position, has an axial opening for receiving a fastening screw, has opposite wing portions on the outer side, which wing portions are configured, after rotation of the nut part from the first into the second rotational position on account of the rotation of the fastening screw in the nut part, to be pulled against a rear side of the second component when a head of the fastening screw is placed against the first component and pushes the latter against the flange of the cage part, wherein in the first rotational position, the wing portions lie radially within the outer contour of the cage part and, in the second rotational position, project radially beyond the outer contour of the cage part while lying against a stop of the cage part, wherein the nut part has a cylindrical portion with an outer diameter at an axial end, and wherein the cage part has a transverse surface, preferably a floor surface, in the region of the stem portion, preferably on the end of the stem portion which is opposite the flange, wherein the transverse surface has a circular opening with an inner diameter which is larger than the outer diameter, wherein, at least in the first rotational position, the nut part is arranged or can be arranged in the cage part in such a manner that the cylindrical portion projects into or through the circular opening.

As a result, the mounting becomes more reliable, since the probability of tilting of the nut part in the cage part is reduced.

The nut part can be made of metal or plastic. The cage part can be made of metal or plastic, but is preferably also plastic.

The nut part preferably has an inner thread which is adapted to the fastening screw in the axial opening.

The cage part preferably has one or more cutouts in which the wing portions of the nut part can be arranged. A separate cutout is preferably provided for each wing portion.

The cylindrical portion is preferably dimensioned to be so long that it projects over at least 20%, preferably 50%, particularly preferably 100% of the rotational movement into the circular opening.

In a further connector according to the invention there is provision that the cage part has at least one surface region which is oblique in relation to the tangential direction, and is bent preferably in the range of 5° to 70°, particularly preferably by approximately 20°, and the nut part has at least one radial projection, preferably two or more radial projections, the axial end surface of which has a second guide region with a surface region which is oblique in relation to the tangential direction, is bent preferably in the range of 5° to 70°, particularly preferably by approximately 20°, and is preferably adapted to the first guide region.

This facilitates the rotational movement of the nut part, which facilitates the mounting of the connector.

The radial projection can have a second guide region on both axial sides or only on one axial side.

The radial projection preferably has the second guide region on the side facing away from the flange region of the cage part. The radial projection is preferably partially formed by the wing portion. The radial projection is preferably larger than the wing portion in the tangential direction and includes said wing portion. The first guide region and the second guide region are preferably reciprocally correspondingly convex and/or concave in partial regions, in order to obtain more gentle junctions.

The radial projection is alternatively formed by a partial region of the wing portion and corresponds thereto.

One of the cutouts in the cage part, preferably all the cutouts, has/have the first guide region as a cutout edge. The first guide region is preferably arranged as stop regions, serving as a stop of the first rotational position and stop of the second rotational position, of the cutout/cutouts which formed/form in each case a stop for the first and second rotational position of the nut part.

In the case of a further connector according to the invention there is provision that the surface region of the second guide region is correspondingly beveled over a tangential angular region of at least 10°, preferably at maximum 120°, particularly preferably of approximately 80-90°.

As a result, particularly good guidance is achieved.

In the case of a further connector according to the invention there is provision that the cage part and the nut part are latchable to each other in the first rotational position such that rotation of the nut part into the second rotational position is possible only after a certain threshold value torque has been overcome.

This facilitates the mounting, since the nut part is more reliably located in the first rotational position at the start of the mounting process.

In the case of a further connector according to the invention there is provision that one out of the cage part and nut part has a radial, preferably rounded, preferably rounded down axially on both sides, preferably annular, latching projection which is configured to latch behind a radial projection of the other in each case out of the cage part and the nut part when the nut part is in the first rotational position.

This easily permits a latching connection.

In the case of a further connector according to the invention there is provision that the nut part has the latching projection, and the latching projection is arranged in or adjacent to the cylindrical portion, and therefore the latching projection is configured to latch behind the inner edge of the circular opening in the first rotational position.

As a result, a simple configuration is provided which already utilizes an existing inner edge of the cage part.

The latching projection preferably has an outer diameter which is larger than the inner diameter of the circular opening.

Alternatively, the nut part has the latching projection or a latching groove which serves as an inner edge in the region of or above the wing portions.

BRIEF DESCRIPTION OF THE DRAWINGS

The invention will now be presented further by way of example with reference to drawings, in which:

FIG. 5B, FIGS. 6A to 6D show the connector 1 from the above figures, inserted into the second component 200 and from a changed perspective, wherein the nut part 20 is located in the rotational positions corresponding to FIGS. 5A-5C, and wherein in FIG. 6d the fastening screw has been completely tightened and the nut part 20 is pulled against the underside of the second component 200.

DETAILED DESCRIPTION

Figure 1:
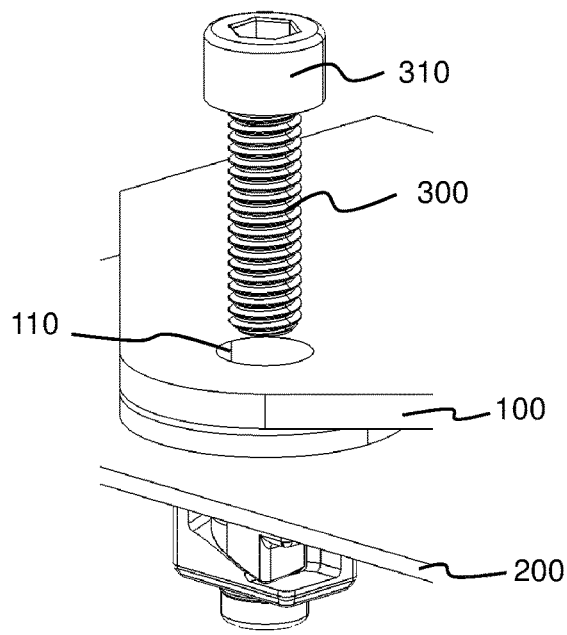
FIG. 1 shows a connector 1 according to the invention just before the final fastening of the first component 100 to the second component 200.
Figure 2:
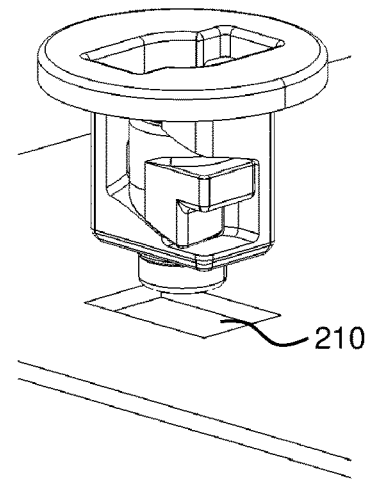
FIG. 2 shows a connector 1 from FIG. 2 before the insertion into the second component 200.

There follows a more detailed description of FIG. 1. The configuration is such that the connector 1 is configured to connect a first component 100 to a second component 200, wherein the components 100, 200 each have an opening 110, 210 with cross sections which are different from a circular cross section, and are polygonal here, even rectangular here, wherein the connector 1 has a cage part 10 which has, at one end, a radial flange 11 and has a stem portion 12 with a cross section which is different from a circular cross section and is polygonal here, even rectangular here, and is insertable into the opening 210 of the second component 200, such that the flange 11 bears against the front side of the second component 200, wherein the connector 1 has a nut part 20 which is at least partially accommodated by the cage part 10, and which is rotatable from a first rotational position in the cage part 10 into a second rotational position, has an axial opening 21 receiving a fastening screw 300, has opposing wing portions 22.1, 22.2 on the outer side, which portions are configured, after rotation of the nut part 20 from the first into the second rotational position on account of the rotation of the fastening screw 300 in the nut part 20, to be pulled against a rear side of the second component 300 when a head 20 of the fastening screw 200 is placed against the first component 310 and pushes the latter against the flange 300 of the cage part 100, wherein in the first rotational position, the wing portions 11 lie radially within the outer contour of the cage part 10 and, in the second rotational position, project 10 beyond the outer contour of the cage part 10 while lying against a stop 13 of the cage part 10, wherein the nut part 20 has a cylindrical portion 23 with an outer diameter D1 at an axial end, and the cage part 10 has a transverse surface 14, herein a floor surface, here ending the stem portion 12, in the region of the stem portion 12, here at the end of the stem portion which is opposite the flange 11 wherein the transverse surface 14 has a circular opening 15 with an inner diameter D2 which is larger than the outer diameter D1, wherein, at least in the first rotational position, the nut part 20 is arranged or can be arranged in the cage part 10 in such a manner that the cylindrical portion 23 projects into or through the circular opening 15.

Figure 3:
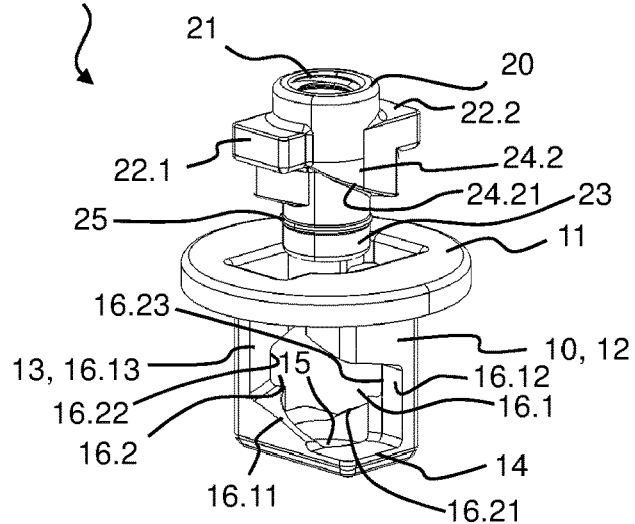
FIG. 3 shows a connector 1 just before the nut part 20 is inserted into the cage part 10.
Figure 6A:
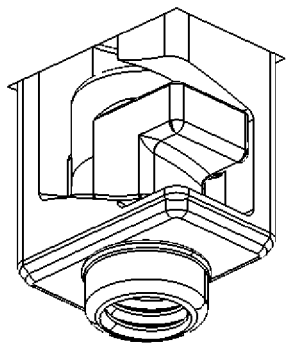
Figure 6B:
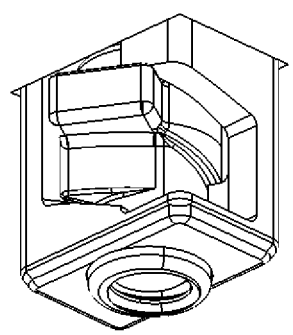
Figure 6C:
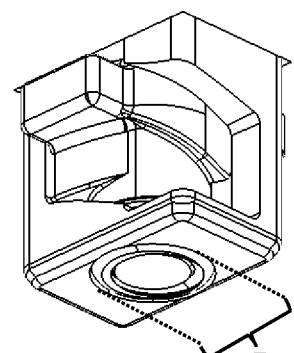

There follows a more detailed description of FIG. 3. The cage part 10 has here two cutouts 16.1, 16.2 in which the wing portions 22.1, 22.2 of the nut part 20 can be arranged. Here, a separate cutout 16.1, 16.2 is present for each wing portion 22.1, 22.2. The cylindrical portion 23 is so long here that it projects into the circular opening 15 over 100% of the rotational movement from the first rotational position into the second rotational position (see FIG. 6C). The configuration is such that the cage part 10 has two first guide regions 16.11, 16.21 with a surface region which is oblique in relation to the tangential direction and is bent here in the range of 5° to 70°, by even approximately 20° here, and the nut part 20 has two radial projections 24.1, 24.2, the axial end faces of which have a second guide region 24.11, 24.21 with a surface region which is oblique in relation the tangential direction, is bent here in the range of 5° to 70°, by even approximately 20° here, and is adapted here to the first guide region 16.11, 16.21. Here, the radial projection 24.1, 24.2 has the second guide region 24.11, 24.21 on the side facing away from the flange region 11 of the cage part 10. The radial projection 24.1, 24.2 is formed here partially by the wing portion 22.1, 22.2. Here, the radial projection 24.1, 24.2 is larger in the tangential direction than the guide portion 22.1, 22.2 and partially includes it. Here, the first guide region 16.11, 16.21 and the second guide region 24.11, 24.21 are reciprocally correspondingly convex and/or concave in partial regions in order to obtain more gentle junctions. Here, the cutouts 16.1, 16.2 of the cage part 10 have the first guide region 16.11, 16.21 as a cutout edge. Here, the first guide region 16.11, 16.21 is arranged between two essentially axially oriented stop regions 16.12, 16.13, 16.22, 16.23, serving as a stop 13 of the first rotational position and a stop of the second rotational position, of the cutouts 16.1, 16.2 which each form a stop for the first and second rotational positions of the nut part 20. The configuration is such that the surface region of the second guide 24.11, 24.21 is correspondingly beveled over a tangential angular region of at least 10°, at maximum 120° here, even approximately 80-90° here. The configuration is such that the cage part 10 and the nut part 20 are latchable to each other in the first rotational position such that rotation of the nut part 20 into the second rotational position is possible only after a certain threshold value torque has been overcome. The configuration is such that one out of the cage part 10 and nut part 20 has a radial latching projection 17, 25, here rounded down axially on both sides, here annular, which is configured to latch behind a radial projection of the other in each case out of the cage part 10 and the nut part 20 when the nut part 20 is in the first rotational position. The configuration is such that the nut part 20 has the latching projection 25, and the latching projection 25 is arranged in or adjacent to the cylindrical portion 23, and therefore the latching projection 25 is configured to latch behind the inner edge of the circular opening 15 in the first rotational position, in contrast to FIGS. 7A to 7C. The latching projection 25 has here an outer diameter D3 which is larger than the inner diameter D2 of the circular opening 15.

Figure 4A:
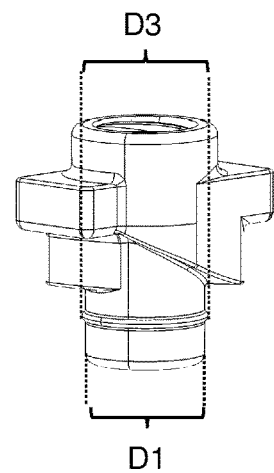
FIGS. 4A and 4B show the nut part 10 of the connector 1 from the above figures in two different perspectives.
Figure 6D:
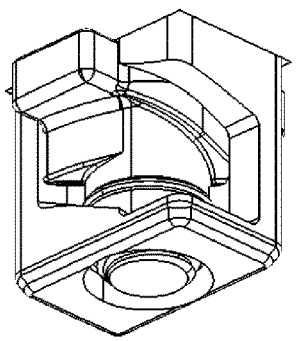
Figure 4B:
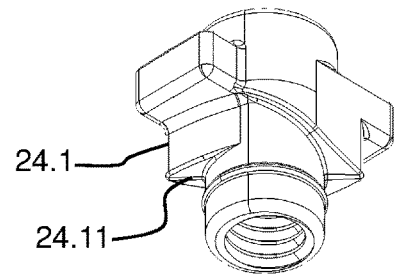
Figure 5A:
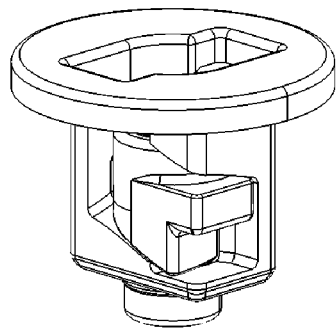
FIG. 5A to 5C show the connector 1 from the above figures, wherein the nut part 20 is located in the first rotational position FIG. 5A, in the second rotational position 5C and in an intermediate position
Figure 5B:
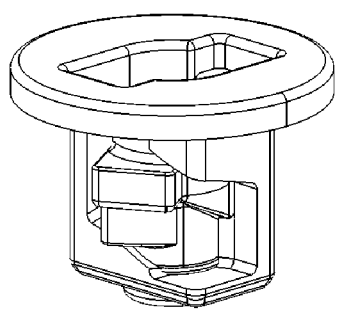
Figure 5C:
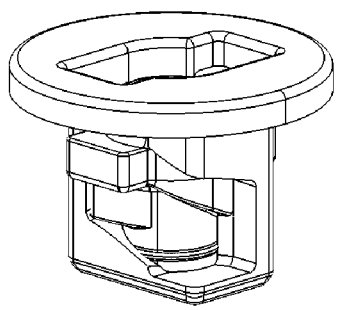

There follows a more detailed description of FIGS. 4A and 4B. Here, the nut part 20 has, in the axial opening 21, an inner thread which is matched to the fastening screw 300.

Figure 7A:
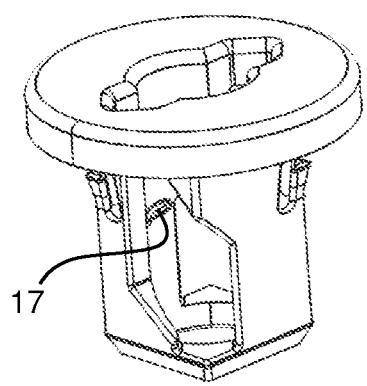
FIGS. 7A to 7C show a connector 1 which is similar to the connector 1 shown in the above figures.
Figure 7B:
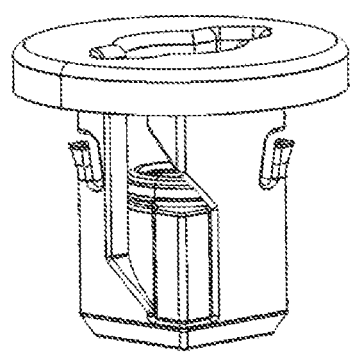
Figure 7C:
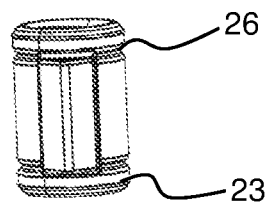

There follows a more detailed description of FIGS. 7A to 7C. The features of the connector from the above figures are also present here, unless described otherwise, wherein the connector in FIGS. 7A-C has a square and not only rectangular stem portion, the first and second rotational positions differ by 45° and not by 90°, the cylindrical portion projects into the circular opening 15 over less than 100% of the rotational movement, and the nut part 20 has the latching projection 25 or a latching groove 26, serving as an inner edge, axially above the wing portions 22.1, 22.2.

The invention can include various aspects, including those set forth in paragraphs A—below:

A. A connector (1), wherein the connector (1) is configured for connecting a first component (100) to a second component (200), wherein the components (100, 200) each have an opening (110, 210) with cross sections different from a circular cross section, wherein the connector (1) has a cage part (10) which has a radial flange (11) at one end and which has a stem portion (12) with a cross section different from a circular cross section, said stem portion being insertable into the opening (210) of the second component (200) such that the flange (11) is positioned against the front side of the second component (200), wherein the connector (1) has a nut part (20) which is at least partially accommodated by the cage part (10) and
  is rotatable from a first rotational position in the cage part (10) into a second rotational position,
  has an axial opening (21) for receiving a fastening screw (300),
  has opposite wing portions (22.1, 22.2) on the outer side, which wing portions are configured, after rotation of the nut part (20) from the first into the second rotational position on account of the rotation of the fastening screw (300) in the nut part (20), to be pulled against a rear side of the second component (200) when a head (310) of the fastening screw (300) is placed against the first component (100) and pushes the latter against the flange (11) of the cage part (10), wherein in the first rotational position, the wing portions (22.1, 22.2) lie radially within the outer contour of the cage part (10) and, in the second rotational position, project radially beyond the outer contour of the cage part (10) while lying against a stop (13) of the cage part (10), wherein the nut part (20) has a cylindrical portion (23) with an outer diameter (D1) at an axial end, and in that the cage part (10) has a transverse surface (14) in the region of the stem portion (12), wherein the transverse surface (14) has a circular opening (15) with an inner diameter (D2) which is larger than the outer diameter (D1), wherein, at least in the first rotational position, the nut part (20) is arranged or can be arranged in the cage part (10) in such a manner that the cylindrical portion (23) projects into or through the circular opening (15).

B. The connector (1) as claimed in A, wherein the cage part (10) has at least one first guide region (16.11, 16.21) with a surface region which is oblique in relation to the tangential direction, and the nut part (20) has at least one radial projection (24.1, 24.2), the axial end surface of which has a second guide region (24.11, 24.21) with a surface region which is oblique in relation to the tangential direction.

C. The connector (1) as claimed in B, wherein the surface region of the second guide region (24.11, 24.21) is correspondingly beveled over a tangential angular region of at least 10°.

D. The connector (1) as claimed in one of A to B, wherein the cage part (10) and the nut part (20) are latchable to each other in the first rotational position such that rotation of the nut part (20) into the second rotational position is possible only after a certain threshold value torque has been overcome.

E. The connector (1) as claimed in D, wherein one out of the cage part (10) and nut part (20) has a radial latching projection (17, 25) which is configured to latch behind a radial projection of the other in each case out of the cage part (10) and the nut part (20) when the nut part (20) is in the first rotational position.

F. The connector (1) as claimed in claim E, wherein the nut part (20) has the latching projection (25), and the latching projection (25) is arranged in or adjacent to the cylindrical portion (23), and therefore the latching projection (25) is configured to latch behind the inner edge of the circular opening (15) in the first rotational position.

LIST OF REFERENCE SYMBOLS

1 Connector
10 Cage part
11 Radial flange
12 Stem portion
13 Stop
14 Transverse surface
15 Circular opening
16.1 Cutout
16.11 First guide region
16.12 Stop region
16.13 Stop region
16.2 Cutout
16.21 First guide region
16.22 Stop region
16.23 Stop region
17 Radial latching projection
20 Nut part
21 Axial opening
22.1 Wing portion
22.2 Wing portion
23 Cylindrical section
24.1 Radial projection
24.11 Second guide region
24.2 Radial projection
24.21 Second guide region
25 Radial latching projection
26 Latching groove
100 First component
110 Opening
200 Second component
210 Opening 300 Fastening screw
310 Head
D1 Outer diameter
D2 Inner diameter
D3 Outer diameter

What is claimed is:

1. A connector, wherein the connector is configured for connecting a first component to a second component, wherein the first component includes an opening and the second component includes an opening with a cross section different from a circular cross section, wherein the connector has a cage part which has a radial flange at one end and which has a stem portion with a cross section different from a circular cross section, said stem portion being insertable into the opening of the second component such that the flange is positioned against the front side of the second component,
   wherein the connector has a nut part which is at least partially accommodated by the cage part and that:
      is rotatable from a first rotational position in the cage part into a second rotational position,
      has an axial opening for receiving a fastening screw,
      has an outer side with opposite wing portions, which wing portions are configured, after rotation of the nut part from the first into the second rotational position on account of the rotation of the fastening screw in the nut part, to be pulled against a rear side of the second component when a head of the fastening screw is placed against the first component and pushes the first component against the flange of the cage part, wherein in the first rotational position, the wing portions lie radially within an outer contour of the cage part and, in the second rotational position, project radially beyond the outer contour of the cage part while lying against a stop of the cage part, wherein the nut part has an axial end with a cylindrical portion with an outer diameter, and in that the cage part has a transverse surface on the stem portion, wherein the transverse surface has a circular opening with an inner diameter which is larger than the outer diameter, wherein, at least in the first rotational position, the nut part is arranged or can be arranged in the cage part in such a manner that the cylindrical portion projects into or through the circular opening;
   wherein one of the cage part or the nut part has an annular latching projection which is configured to latch behind an annular projection of the other of the cage part or the nut part when the nut part is in the first rotational position for latching the cage part and the nut part to each other in the first rotational position such that rotation of the nut part into the second rotational position is possible only after a certain threshold value torque has been overcome.

2. The connector as claimed in claim 1, wherein the nut part has the latching projection, and the latching projection is arranged in or adjacent to the cylindrical portion, and the latching projection is configured to latch behind an inner edge of the circular opening in the first rotational position.

3. A connector, wherein the connector is configured for connecting a first component to a second component, wherein the first component includes an opening and the second component includes an opening with a cross section different from a circular cross section, wherein the connector has a cage part which has a radial flange at one end and which has a stem portion with a cross section different from a circular cross section, said stem portion being insertable into the opening of the second component such that the flange is positioned against the front side of the second component,
   wherein the connector has a nut part which is at least partially accommodated by the cage part and that:
      is rotatable from a first rotational position in the cage part into a second rotational position,
      has an axial opening for receiving a fastening screw,
      has an outer side with opposite wing portions, which wing portions are configured, after rotation of the nut part from the first into the second rotational position on account of the rotation of the fastening screw in the nut part, to be pulled against a rear side of the second component when a head of the fastening screw is placed against the first component and pushes the first component against the flange of the cage part, wherein in the first rotational position, the wing portions lie radially within an outer contour of the cage part and, in the second rotational position, project radially beyond the outer contour of the cage part while lying against a stop of the cage part, wherein the nut part has an axial end with a cylindrical portion with an outer diameter, and in that the cage part has a transverse surface on the stem portion, wherein the transverse surface has a circular opening with an inner diameter which is larger than the outer diameter, wherein, at least in the first rotational position, the nut part is arranged or can be arranged in the cage part in such a manner that the cylindrical portion projects into or through the circular opening;
   wherein the cage part has at least one first guide region with a surface region which is oblique in relation to an axial direction of movement of the nut part within the cage part and the nut part has at least one radial projection, the axial end surface of which has a second guide region with a surface region which is oblique in relation to the tangential direction.

4. The connector as claimed in claim 3, wherein the surface region of the second guide region is correspondingly beveled over an angular region of at least 10°.

5. A connector configured for connecting a first component to a second component, wherein the first component includes an opening and the second component includes an opening with a cross section different from a circular cross section, wherein the connector comprises:
   a cage part including a radial flange at one end and a stem portion with a cross section different from a circular cross section, said stem portion being insertable into the opening of the second component such that the flange is positioned against a front side of the second component,
   wherein the connector further includes a nut part at least partially accommodated by the cage part,
   wherein the nut part is rotatable from a first rotational position in the cage part into a second rotational position, during which rotation from the first rotational position to the second rotational position the nut part moves axially in a direction out of the cage part,
   wherein the nut part includes an axial opening for receiving a fastening screw,
   wherein the nut part includes an outer side with opposite wing portions wherein the wing portions are configured, after rotation of the nut part from the first rotational position into the second rotational position on account of the rotation of the fastening screw in the nut part, to be pulled against a rear side of the second component by axial movement in a direction toward the flange when a head of the fastening screw is placed against the first component and pushes the first component against the flange of the cage part, wherein, in the first rotational position, the wing portions lie radially within an outer contour of the cage part and, in the second rotational position, the wing portions project radially beyond the outer contour of the cage part while lying against a stop of the cage part, wherein the nut part has an axial end with a cylindrical portion with an outer diameter, and wherein the cage part has a transverse surface on the stem portion, wherein the transverse surface has a circular opening with an inner diameter that is larger than the outer diameter, wherein, at least in the first rotational position, the nut part is arranged or can be arranged in the cage part such that the cylindrical portion projects into or through the circular opening;

wherein each wing portion of the nut part includes an inclined guide region surface that faces in part toward the axial end of the nut part, wherein the cage part includes an inclined guide region surface that face in part away from the transverse surface of the cage part, wherein interaction of the inclined guide region surface of the nut part and the inclined guide region surface of the cage part during rotation of the of the nut part from the first rotational position into the second rotational position causes the nut part to move axially in the direction out of the cage part.

* * * * *